United States Patent Office 3,485,119
Patented Dec. 23, 1969

3,485,119
LATHES AND LIKE MACHINE TOOLS
Edward Thomas Christie, Arnfield Works, Audenshaw, near Manchester, England, and Gianfranco Villa, Macherio, Milan, Italy
Filed Sept. 6, 1967, Ser. No. 665,794
Claims priority, application Great Britain, Sept. 6, 1966, 39,844/66
Int. Cl. B23b 3/28; B23c 3/28, 3/32
U.S. Cl. 82—11                                      14 Claims

ABSTRACT OF THE DISCLOSURE

A lathe or the like for turning a helical rotor wherein a cutting tool is advanced along the lathe while a workpiece is rotated about an axis which itself is rotated about a parallel fixed axis. A positive drive preferably including epicyclic gearing is provided for maintaining the relative speeds of rotation about the two axes proportional to the speed of advance of the tool.

---

This invention relates to lathes and like machine tools, and more especially to such lathes which are adapted for the manufacture of helical rotors which comprise an eccentric having a lobe which follows a helical path around the axis of the workpiece. Such helical rotors are used in helical gear pumps of a type in which a helical rotor meshes with a helical stator, one of the two elements having one more thread than the other.

In one type of lathe for producing a workpiece of this type, the workpiece is supported by a centre eccentrically mounted on a rotatable spindle, and is rotated by a sleeve rotatable relative to and concentric with the spindle. The pitch of the helical path followed by the lobe or the workpiece is dependent upon the ratio of the relative speed of rotation between the sleeve and the spindle to the rate of feed of a tool along the workpiece. It is an object of the invention to improve the accuracy of shaping of a workpiece, the helical lobe of which has a certain pitch, by ensuring by means of a positive drive connection, that the sleeve rotates relative to the spindle at a speed which is in a strict ratio to the speed of advance of a tool along the workpiece.

According to the invention there is provided a lathe or like machine tool for the manufacture of helical rotors, which comprises a first drive means for rotating a workpiece about a first axis, a second drive means for rotating the first axis about a second axis parallel thereto, and means for advancing a cutting tool along the lathe in a direction parallel with the first and second axes, a positive drive being provided connecting the advancing means to the first and second drive means whereby the relative speed of the first and second drive means is proportional to the speed of the advancing means. Because of the positive drive connection between the advancing means and the first and second drive means a person operating the lathe can readily control either the speed of rotation of the workpiece or the speed of advance of the cutting tool independently without there being any possibility of the advance of the tool getting out of the proper required relationship with the eccentric rotation of the workpiece.

Suitably the first and second drive means may be connected respectively to two elements of an epicyclic gear chain, the drive from the advancing means connecting with a third element of the epicyclic gear chain. Preferably the epicyclic gear chain comprises a sun gear, a ring gear and planet gears carried by a planet carrier and engaging both the sun gear and the ring gear, the sun gear being connected to the drive from the advancing means and the planet carrier and ring gear being connected to the first and second drive means. Alternatively the epicyclic gear chain may comprise planet gears carried by a planet carrier and engaging a sun gear, the planet carrier comprising a third element and being connected to the drive from the advancing means and the first and second drive means being connected to the sun gear and a rotational drive to the planet gears. Conveniently the rotational drive to the planet gears may comprise a second sun gear meshing with second planet gears rotatable with the first planet gears, the first drive means being connected to the second sun gear and the second drive means being connected to the first sun gear.

In the preferred construction, later described in detail, the lathe comprises a headstock with the second drive means comprising a centre spindle rotatably mounted in the headstock and adapted to carry a workpiece supporting centre eccentrically thereof. The lathe also comprises a tailstock carrying a rotatable tail spindle adapted to carry a workpiece supporting centre eccentrically thereof, a drive connection being provided between the centre spindle and the tail spindle whereby during use of a lathe the centre spindle and the tail spindle rotate together so that both ends of the workpiece are simultaneously carried through the same eccentric movement. Preferably the first drive means includes a main drive sleeve rotatable in a headstock and surrounding the centre spindle so as to be rotatable relative thereto.

The advancing means may, as conventional, comprise a lead screw extending lengthwise of the lathe bed, a saddle adapted to carry a cutting tool being movable lengthwise of the lathe in response to rotation of the lead screw.

In order to allow workpieces having different pitch lengths to be formed on the lathe, means are preferably provided for changing the speed ratio of the drive from the advancing means to the epicyclic gear chain, these means may simply comprise replaceable gears in a gear chain between lead screw and the sun gear of the epicyclic gearing. Preferably also, a reversible drive is provided between the lead screw and the sun gear whereby a workpiece may be cut with a left-hand or right-hand helix depending upon the direction of the drive from the load screw to the sun gear.

Preferably the lathe is driven from a main power source via the main drive sleeve so as to avoid the connection between the first and second drive means having to withstand the cutting lead. Preferably a cross slide is provided on the saddle for advancing the tool towards a workpiece with a magnetic clutch being provided for connecting a cross-feed drive with the lead screw drive whereby a predetermined chamfer angle can be cut on a workpiece when required.

The invention will now be described in greater detail, merely by way of example, with reference to the accompanying drawings, in which.

Figure 1:
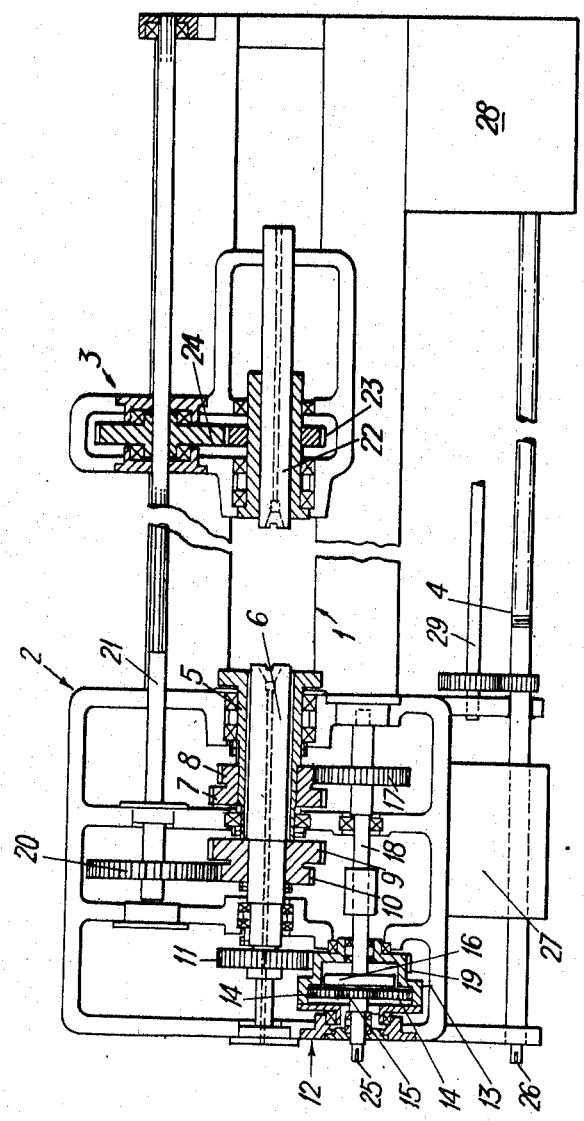
FIGURE 1 is a plan view, partly in section, of a lathe embodying the present invention.

Referring now to the drawings in greater detail, there is shown a lathe comprising a lathe bed 1, a headstock 2 and a tailstock 3. A lead screw 4 is provided for advancing a saddle (not shown) lengthwise of the lathe bed, the saddle being adapted to carry by means of a cross slide a cutting tool for working a workpiece (not shown) supported by the lathe.

The headstock has rotatably mounted therein a main drive sleeve 5 and, concentric therewith, a centre spindle 6. Gears 7 and 8 are secured on the drive sleeve 5 whilst gears 9, 10 and 11 are carried by the centre spindle 6.

An epicyclic gear chain 12 drivingly connects the main drive sleeve 5 and the centre spindle 6. This epicyclic gear chain comprises an annulus or ring gear 13, three planet wheels 14 engaging the ring gear 13, a sun gear 15 engaged by the planet wheels 14 and a planet carrier 16 supporting the axes of the planet wheels. The planet carrier 16 is drivably connected to the drive sleeve 5 by means of a gear wheel 17 engaging the gear 8 and mounted upon a shaft 18 secured to the planet carrier 16. The driving connection to the centre spindle 6 is by means of a gear 19 rotatable with the ring gear 13 and engaging the gear 11. A gear 20 engaging the gear 10 is secured upon a rotatable splined shaft 21 extending along the length of the lathe bed.

The tail stock 3 comprises a rotatable tail spindle 22 rotatably driven by a gear 23 meshing with a gear 24 which in turn is rotatably driven by the splined shaft 21. The tail spindle 22 is concentric with the centre spindle 6 and the gear ratio of the gears 24 and 23 is identical with that of the gears 20 and 10 so that the tail spindle 22 and centre spindle 6 are synchronously rotatable during use of the lathe. The tail spindle 22 is, like the tail spindle 6, adapted to carry a centre for supporting a workpiece for rotation about a first axis which is eccentric to a second axis, the second axis being the axis of the spindles 6 and 22. A gear chain, not shown, provides a positive driving connection between the lead screw 4 and the sun gear 15. This gear chain comprises a gear A replaceably mountable upon a shaft 25 extending from the sun gear 15, a gear D mounted upon a shaft 26 connected with the lead screw 4 and two gears B and C mounted upon a quadrant stud with the gear B meshing with a gear A and gear C meshing with gear D. It will be appreciated that by changing the ratios of the gears A, B, C and D different drive ratios can be provided between the lead screw 4 and the sun wheel 15. The lead screw 4 is driven by a drive generally indicated at 27 for advancing the saddle lengthwise of the lathe. A separate quick return drive for the lead screw is provided at 28. A cross feed drive to the saddle is provided by a shaft 29 drivably connected by means of gears with the lead screw 4. A magnetic clutch, not shown, is provided for connecting the cross feed drive with the cross slide so that a chamfer with predetermined angle can be cut on a workpiece when required. In a particular embodiment the chamfer is at 25° to the normal to the axis (corresponding to a 25° approach angle on the tool).

During use of the lathe a workpiece is centre drilled and is then mounted on lathe centres having an eccentricity equal to that of the finished rotor cross section. These centres are mounted upon the centre spindle 6 and the tail spindle 22 which are synchronously rotatable. The workpiece is driven by the sleeve 5 by means of a coupling, such as an Oldham coupling, which accommodates the workpiece eccentricity. During a cutting operation the spindle 6 and sleeve 5 are so relatively rotatable that the centre spindle loses one revolution in the number of revolutions necessary to cut a single pitch length along a workpiece at the selected tool feed. The epicyclic gear 12 gives an input from the lead screw 4 so as automatically to compensate the relative speed of the spindle 6 and sleeve 5 in accordance with the rate of tool feed lengthwise of the lathe determined by the speed of rotation of the lead screw 4.

The main drive to the lathe is via the gear 7 so that the workpiece is directly rotated without the epicyclic gear chain 12 having to transmit the full cutting load, merely being required slowly to rotate the centre spindle 6 relative to the main drive sleeve 5. However, in the embodiment illustrated provision is made whereby, if required, the main drive can be applied to the centre spindle. This simply means that instead of driving the gear 7 the main drive from a power source would be arranged to drive the gear 9.

Suitably the main drive may include a suitable Kopp Variator fitted with a handwheel regulator. Means may also be provided for setting the speed range. It is also envisaged that an electronically controlled drive could be used in which controls could be set to required roughing and finishing speeds by means of potentiometers, the roughing or finishing speed required being selected by a pushbutton.

As indicated above the lead screw has an independent drive with provision for rapid return of the saddle. It is important that the connection between the lead screw and the sun gear is not broken once the machine is set up or the correct relationship between a workpiece and a cutting tool would be lost. For this reason, it is preferred that a split nut should not be used to connect the lead screw with the saddle. By providing reversible idlers in the gear chain between shafts 25 and 26 it is possible to reverse the direction of rotation of the sun gear relative to the lead screw so that the lathe may be readily adapted for the machining of left-hand or right-hand thread workpieces without reversing the main spindle and cuting tool.

An example of the gear ratios which may be used for the gearing providing the connection between the sleeve 5 and spindle 6 is given in the following table.

| Gears: | No. of Teeth |
|---|---|
| Epicyclic gear: | |
|     Sun wheel 15 | 30 |
|     Planets 16 | 30 |
|     Annulus internal gear 13 | 90 |
|     Annlus outer gear 19 | 60 |
|     Planet carrier drive gear 17 | 70 |
| Centre spindle, gear mating with annulus outer gear 11 | 80 |
| Main spindle, gear mating with planet carrier drive 8 | 70 |

The above gear toothings give a ratio for the sun wheel to the planet carrier of 4:1 and of the ring gear to the planet carrier of 4:3. With this arrangement it will, therefore, be apparent that when the sun wheel is held fixed, that is when there is no rotation of the lead screw and consequent advance of the tool, the epicyclic gearing provides a drive such that the centre spindle 6 will rotate at the same speed as the sleeve 5. Four revolutions of the sun wheel will be equivalent to one revolution of the planet carrier thus causing one revolution of the centre spindle 6 relative to the sleeve 5.

In the following table we give examples of gearing which may be used in the drive connection between the shafts 25 and 26 to provide for particular workpiece pitches. These figures are calculated on the basis that the pitch of the lead screw is 6 mm.

| Rotor pitch, mm. | Gear on Sun Wheel A | Gears on Quadrant Stud B | C | Gear on lead screw D |
|---|---|---|---|---|
| 11.25 | 90 | 70 | 35 | 96 |
| 22.50 | 100 | 60 | 45 | 80 |
| 33.75 | 90 | 70 | 105 | 96 |
| 45.00 | 100 | 60 | 90 | 80 |
| 30.00 | 100 | 60 | 60 | 80 |
| 60.00 | 100 | 60 | 120 | 80 |
| 37.50 | 100 | 60 | 75 | 80 |
| 40.00 | 100 | 60 | 80 | 80 |
| 50.00 | 100 | 60 | 100 | 80 |
| 51.020 | 110 | 50 | 86 | 89 |

It should be appreciated that the rotor pitch in the above example based upon four turns of the sun wheel for one revolution of the centre 6 relative to the sleeve 5, and a 6 mm. pitch lead screw equals $$4 \times \frac{A}{B} \times \frac{C}{D} \times 6 \text{ mm.}$$

As indicated above the rotor, for the manufacture of which the above-described lathe has been particularly designed, has a finished appearance somewhat like a corkscrew, a cross section through the rotor, normal to its axis, showing a true circular section eccentric to the workpiece axis. By use of the above-described lathe this rotor can readily be machined from a cylindrical workpiece. During manufacture of the rotor the head of the rotor, where the helical screw portion meets a cylindrical end portion of the workpiece, is at the headstock end of the workpiece, a chamfer being provided between the helical portion and the cylindrical portion of the workpiece. This chamfer is generated in use of the lathe by a powered cross-transverse withdrawal of the cutting tool combined with the normal longitudinal feed. The magnetic clutch for engaging the cross-feed is controlled by a limit switch, not shown, operable in response to movement of the saddle to a predetermined position near the head end of the workpiece.

Figure 2:
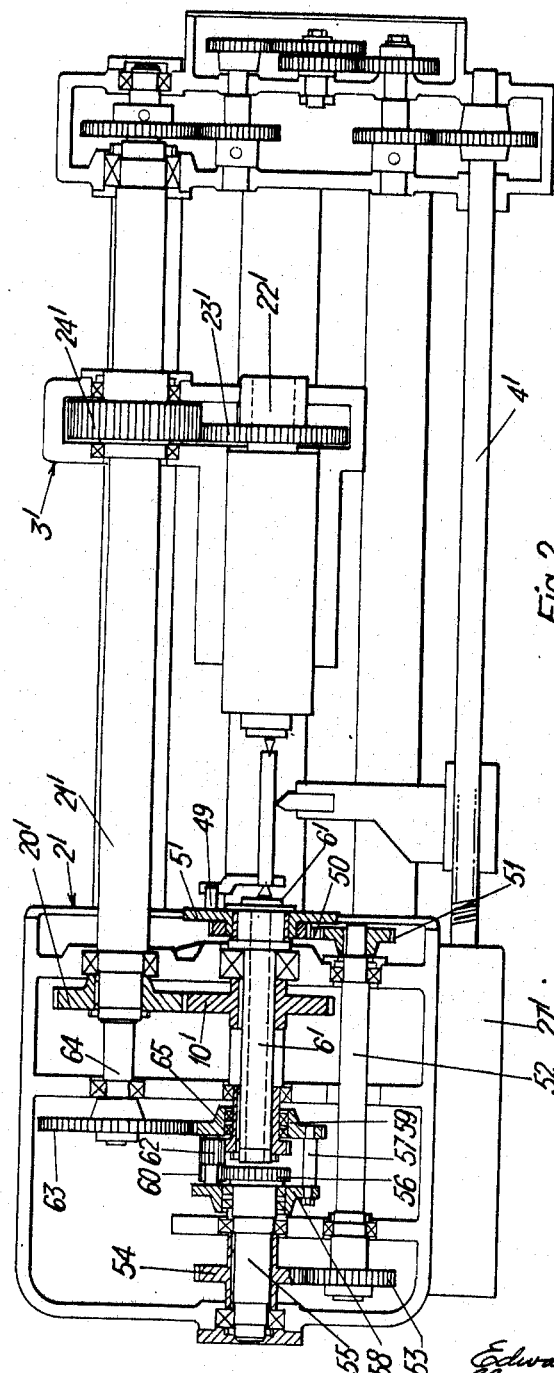
FIGURE 2 is a view similar to FIGURE 1 but showing an alternative embodiment of the invention.
Figure 3:
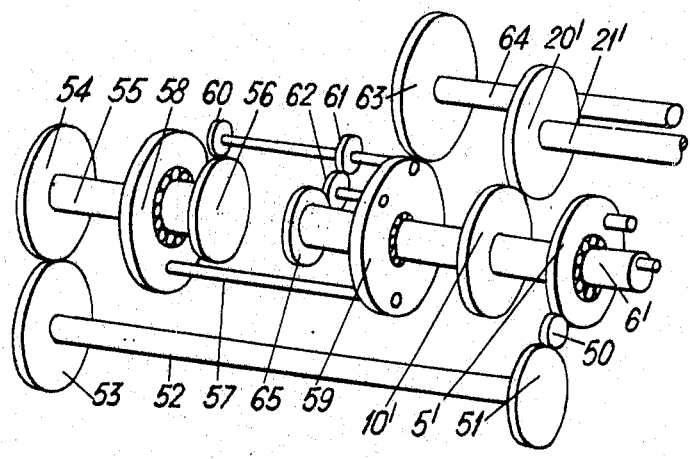
FIGURE 3 is a diagrammatic perspective view illustrating the gear train of the embodiment of FIGURE 2.

Those parts of the embodiment of FIGURE 2 which are similar to corresponding parts in the embodiment of FIGURE 1 are shown with the same reference numerals as used in FIGURE 1 except for the addition of an index mark. As in the embodiment of FIGURE 1 a main drive 5' is rotatable about a centre spindle 6' carrying an eccentric centre for a workpiece. The main drive sleeve 5' carries a drive 49 for rotating a workpiece about the centre carried by the spindle 6'. A main drive is supplied by means for a gear, not shown, engaging a pinion 10' keyed to the spindle 6'.

The rear end of the spindle 6' rotatably supports a planet carrier 59 and carries a sun gear 65 for rotation therewith. A planet wheel 62 meshes with the sun gear 65 and also meshes with a pinion 61 also carried for rotation by the planet carrier 59. A second planet carrier 58 coaxial but spaced from the planet carrier 59 is rotatable therewith by means of a tie rod 57 and supports a planet wheel 60 which is rotatable with the pinion 61. The planet wheel 60 meshes with a sun gear 56 rotatable with a shaft 55 having a gear 54 keyed thereto. A gear 54 meshes with a gear 53 carried by a shaft 52 which also carries a gear 51 meshing with an idler gear 50 which in turn engages a gear formed on the outer surface of the drive sleeve 5'.

A gear 63 meshes with the planet gear carrier 59 and rotatably drives a shaft 54 which extends coaxially within a hollow drive shaft 21' throughout the length of the lathe, a gear train connecting the remote end of the drive shaft 64 with the lead screw 4' so as to provide a driving connection therebetween. The gears in this gear train are replaceable to provide alternative gear ratios between a shaft 64 and the lead screw 4'. A gear 24' in a tailstock is driven by the hollow shaft 21' and engages a pinion 23' for rotating a spindle 22' carrying a centre eccentrically thereof for rotation in synchronism with the centre carried eccentrically by the spindle 6'.

During use of this apparatus the spindle 6' is driven by the gear 10' so as to rotate the eccentric centre about the axis of the spindle. A drive is taken from the sun gear 65 via the gears 62, 61 and 60 to the sun gear 56, shaft 55, gears 54 and 53, shaft 52, and gears 51 and 50 to the main drive sleeve 5' which rotates via the drive means 49 a workpiece about the eccentrically mounted centres. The speed of rotation of the sleeve 5' relative to the spindle 6' is controlled by the speed of rotation of the planet carriers 59 about the axis of the spindle 6'. The speed of the planet carrier 59 is directly proportional to the speed of rotation of the lead screw so that with a given fixed speed drive to the gear 10' variation in the speed of operation of the lead screw drive unit 27' will vary the speed of rotation of the sleeve 5' to compensate for the change in speed of advance of the cutting tool do that a helical workpiece is accurately machined whatever the speed of advance of the cutting tool.

We claim:

1. A lathe or like machine tool for the manufacture of helical rotors which comprises first axis means for supporting a workpiece for rotation about said first axis, a first drive means for rotating the workpiece about said first axis, a second drive means for rotating the first axis means about a second axis parallel thereto, means for advancing a cutting tool along the lathe in a direction parallel with the first and second axes, and a positive drive mechanism connecting the advancing means to the first and second drive means whereby the relative speed of the first and second drive means is proportional to the speed of the advancing means, said positive drive mechanism including an epicyclic gear chain having at least three elements, the first and second drive means being connected respectively to two elements of the epicyclic gear chain and the drive from the advancing means connecting with a third element of the epicyclic gear chain.

2. A lathe according to claim 1 wherein the epicyclic gear chain comprises a sun gear, a ring gear, a planet carrier and planet gears carried by said planet carrier and engaging both the sun gear and the ring gear, said sun gear comprising the element connected to the drive from the advancing means and said planet carrier and said ring gear comprising the elements respectively connected to the first and second drive means.

3. A lathe according to claim 1, which includes a main power source and the first drive means comprises a main drive sleeve, the lathe being driven from the main power source via the main drive sleeve so as to avoid the connection between the first and second drive means having to withstand the cutting load.

4. A lathe according to claim 1, wherein the epicyclic gear chain comprises a sun gear, a planet carrier and planet gears carried by said planet carrier and engaging said sun gear and a rotational drive to the planet gears, the planet carrier comprising the third element and being connected to the drive from the advancing means, the first two elements comprising the sun gear and the planet gears with the first and second drive means being connected respectively to the rotational drive to the planet gears and to the sun gear.

5. A lathe according to claim 4 wherein the rotational drive to the planet gears comprises second planet gears rotatably driving the first planet gears, and a second sun gear meshing with said second planet gears, the first drive means being connected to said second sun gear and the second drive means being connected to said first sun gear.

6. A lathe according to claim 1, which comprises a headstock with the second drive means comprising a centre spindle rotatably mounted in the headstock and adapted to carry a workpiece supporting centre eccentrically thereof.

7. A lathe according to claim 6, which comprises a tailstock carrying a rotatable tail-spindle adapted to carry a workpiece supporting centre eccentrically thereof, and a drive connection between the centre spindle and the tail spindle whereby during the use of the lathe the centre spindle and tail spindle rotate together.

8. A lathe according to claim 6, wherein said first drive means includes a main drive sleeve rotatable in the headstock and surrounding the centre spindle so as to be rotatable relative thereto.

9. A lathe according to claim 1, wherein the advancing means comprises a lead screw extending lengthwise of the lathe bed, and a saddle adapted to carry a cutting tool and mounted for movement lengthwise of the lathe in response to rotation of the lead screw.

10. A lathe according to claim 9, wherein a reversible drive is provided between said lead screw and said third element whereby a workpiece may be cut with a left-hand or right-hand helix depending upon the direction of the drive from the lead screw to said third element.

11. A lathe according to claim 9, which includes a cross feed slide mounted on the saddle for advancing the tool towards a workpiece.

12. A lathe according to claim 11, which includes a magnetic clutch for connecting the cross feed drive with the lead screw drive whereby a predetermined chamfer angle can be cut on a workpiece.

13. A lathe according to claim 1, wherein means are provided for changing the speed ratio of the drive from the advancing means to the epicyclic gear chain.

14. A lathe according to claim 9, including a gear chain between the lead screw and the third element of the epicyclic gearing and having replaceable gears therein for changing the speed ratio of the drive from the advancing means to to epicyclic gear chain.

References Cited

UNITED STATES PATENTS 2,189,868  2/1940  Hagerman _____ 82—18

FOREIGN PATENTS 507,833  6/1939  Great Britain.

LEONIDAS VLACHOS, Primary Examiner

U.S. Cl. X.R.

90—11.4